Dec. 12, 1933.     D. F. DALTON     1,938,812
SLIDE FASTENER
Filed Dec. 4, 1930
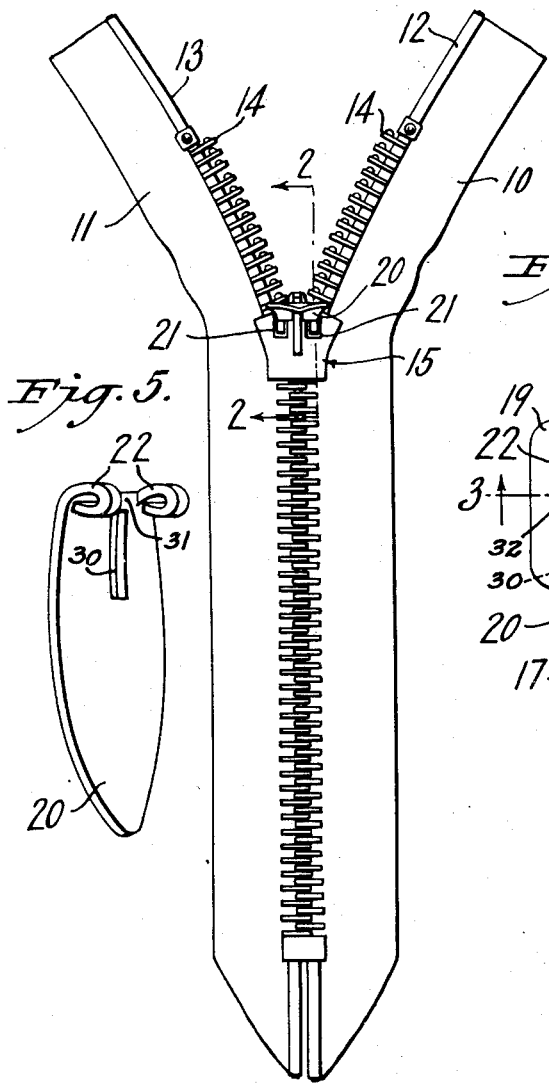
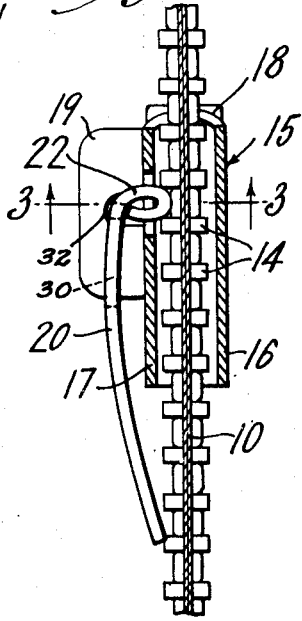
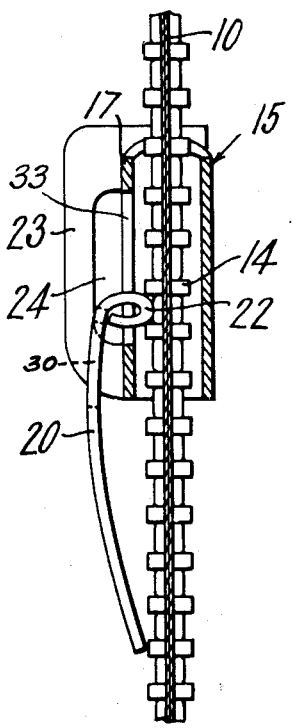
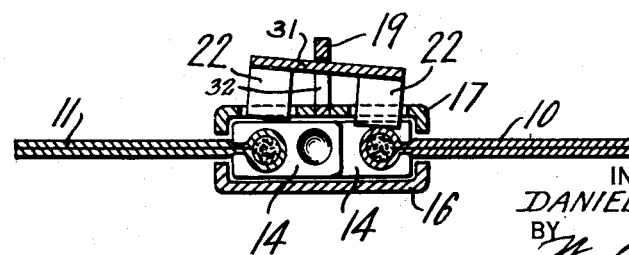
INVENTOR
DANIEL F. DALTON
BY
ATTORNEY Patented Dec. 12, 1933

1,938,812

UNITED STATES PATENT OFFICE 1,938,812

SLIDE FASTENER

Daniel F. Dalton, Waterbury, Conn., assignor to The Shoe Hardware Company, Waterbury, Conn., a corporation of Connecticut Application December 4, 1930. Serial No. 499,935

4 Claims. (Cl. 24—205)

My present invention relates to flexible closures of the slide fastener type, and more particularly to an improved locking device for the operating slider thereof.

In the present form of flexible closure, a plurality of fastener elements are arranged in staggered relation on the opposite edges of a pair of flexible stringers, and a slider element is mounted on the fastener elements and on the stringers to bring the fastener elements into or out of engagement with each other. In such forms of fastening devices, it is desirable that means be provided for maintaining the slider element in any fixed position on the fastener elements, and which locking means is easy to manipulate and positive in its action. Various mechanisms have been suggested for this purpose, such mechanisms consisting mostly in locking teeth or detents, either affixed directly to the slider pull or attached to the body of the slider, and in turn operated by the slider pull. Such constructions, however, are objectionable in that the detent or tooth has a tendency to tear the fabric strip to which the fastener elements are attached, and have to be relatively carefully positioned in order to have the same move into locking position.

I have obviated the objections of prior devices, and have produced a locking device consisting essentially of a cam or pair of cams mounted on or formed integral with the slider pull, and which will rigidly lock the slider in any adjusted position along the length of the fastener strip and which will readily cam itself into locking position, thus obviating the necessity of using any care in manipulating the locking device. Further, in my improved device, I preferably provide a pair of such cam members symmetrically located with respect to the slider pull adjacent the pivot point thereof, and on either side of such pivot point and arrange such cams in a transverse line perpendicular to the length of the slider. This construction enables an efficient camming action to take place, as one cam of the pair will readily cam itself into the space between two adjacent fastening elements on one stringer, while the other cam will ride up on the top of the fastener element located on the other stringer, and thus assist to force the first-mentioned cam firmly into position between the fastener elements.

The object of my invention, therefore, is an improved locking means for interlocking member sliders.

In the accompanying drawing, illustrating a preferred embodiment of my invention;

Figure 1 is an elevation of a flexible closure showing a slider with my invention embodied therein in position on the fastener elements;

Fig. 2 is an enlarged sectional and elevation of a portion of Fig. 1, taken on the line 2—2;

Fig. 3 is a sectional plan view on the line 3—3 of Fig. 2;

Fig. 4 is a sectional side elevation on an enlarged scale, similar to Fig. 2, but in which a sliding bail for the slider pull is employed, and Fig. 5 is a perspective view of a slider pull showing the locking cams formed thereon.

Referring to the drawing, 10 and 11 designate fabric strips, each having a corded edge 12 and 13, respectively, and on such corded edges are parallelly arranged fastener elements 14, these fastener elements being arranged on the fabric strips 10 and 11 in staggered relation, as is usual. Slidably mounted on the fastener elements 14 is a slider 15 of the usual construction; this slider comprises essentially a rear plate 16 and a front plate 17 connected together at the upper central ends by a connecting neck 18. On the front plate 17 is secured a bail member 19 to which is pivotally attached one end of a pull device 20. The pivotal connection is made possible by providing the pull device 20 with a slot 30 adjacent one end thereof thereby leaving a shaft or bar of metal 31 across the outer end of the slot 30, and which acts as a bearing for the pull device 20 in the slot 32 formed in the bail member 19. This slot 32 in addition to carrying the shaft 31 at the end of the pull device 20 allows the pull 20 to be rotated into camming position for the cams 22 as shown in Fig. 2. On the front plate 17 on either side of the member 19 adjacent the pivot point of the pull 20 are perforations 21, through which extend cam members 22 formed on or integral with, and adjacent to the pivot end of the pull 20. As will be seen from an inspection of Fig. 5, such cam members 22 are rounded, and by referring to Fig. 2, it will be noted that such rounded end of the cam 20 fits into the space between two adjacent fastening elements 14 on the stringers 10 and 11. The pull 20 is manipulated in the usual way to move the slider 15 along the fastener elements 14 to move the same into engaging position or to disengage the same. The pull 20 in this operation is rotated about the pivot point so as to move the cam members 22 out of engagement with the fastener elements 14. When in the position desired, as in Fig. 1, the operator will move the pull 20 from the position shown in Fig. 1 to the position shown in Fig. 2, at which time it will rock laterally, when one cam member 22 moves into the space between adjacent fastener elements 14, and the other cam member 22 rides up on the fastener element 14 of the other stringer that lies between the two adjacent elements engaged by the first cam member 22. This operation will be made clear by an inspection of Fig. 3, where the right-hand cam member 22 is shown in camming position with respect to the fastener elements 14 on the stringer 10, while the left-hand cam member 22 is shown riding on the top of the fastener element 14 attached to the stringer 11.

Referring now to Fig. 4, there is shown the slider 15, to the front plate 17 of which is attached a bail holder 23 which forms a sliding path 24 for the bail or pull 20. An elongated opening 33 is formed in the slider on each side of bail holder 23, in order that the cam members 22 may be projected therethrough at any location of the pull 20 longitudinally of the slider. With this form of the device, the slider 15 may be readily moved in either direction, while having the pull 20 in the best position thereon to provide easy movement and the cam locking members 22 may be readily moved into locking position, as shown in such Fig. 4, whenever it is desired to lock the slider 15 in position.

Various modifications will suggest themselves to those skilled in the art, and I do not wish to limit myself to the exact construction shown, otherwise than as set out in the appended claims.

Having thus described my invention, what I claim and desire to protect by Letters Patent is:

1. The combination with a pair of stringers having interlocking elements thereon, of a slider movable along said stringers to control said interlocking elements, a pull device slidably, pivotally and rockably mounted on said slider for moving said slider along the stringers and for locking the slider thereon, a locking cam formed on said pull device, said slider having an opening of such length as to enable it to receive said cam regardless of the position to which the pull device has been slid on the slider body, said cam being movable through said opening into direct contact with adjacent interlocking elements on one of the stringers by movement of the pull device about its pivot at any point in its sliding movement with respect to the slider.

2. The combination with a pair of stringers having staggered interlocking elements thereon, of a slider movable along said stringers to actuate the interlocking elements, a pull device loosely pivoted on said slider whereby it is adapted to rock laterally thereon, and a pair of locking cams formed on said pull device, one of said cams being movable, at any given position of the slider, between adjacent elements on one of the stringers, while the other cam rides up on an adjacent element on the other stringer.

3. The combination with a pair of stringers having staggered interlocking elements thereon, of a slider movable along said stringers to actuate said elements, a pull device loosely pivoted on said slider whereby it is adapted to rock laterally thereon, and a locking cam formed on each side of said pull device, one of said cams being movable between adjacent interlocking elements on one of said stringers by the movement of said pull device about its pivot while the other cam rides up on an element on the other stringer.

4. The combination with a pair of stringers having staggered interlocking elements thereon, of a slider movable along said stringers to actuate said elements, a pull device loosely pivoted on said slider intermediate the ends thereof whereby it is adapted to rock laterally thereon, and a pair of locking cams formed on said pull device one on each side of the pivot thereof, one of said cams being adapted to be wedged between adjacent interlocking elements on one stringer upon moving the pull downwardly about its pivot while the other cam rides up on the side face of an element on the other stringer.

DANIEL F. DALTON.